UNITED STATES PATENT OFFICE.

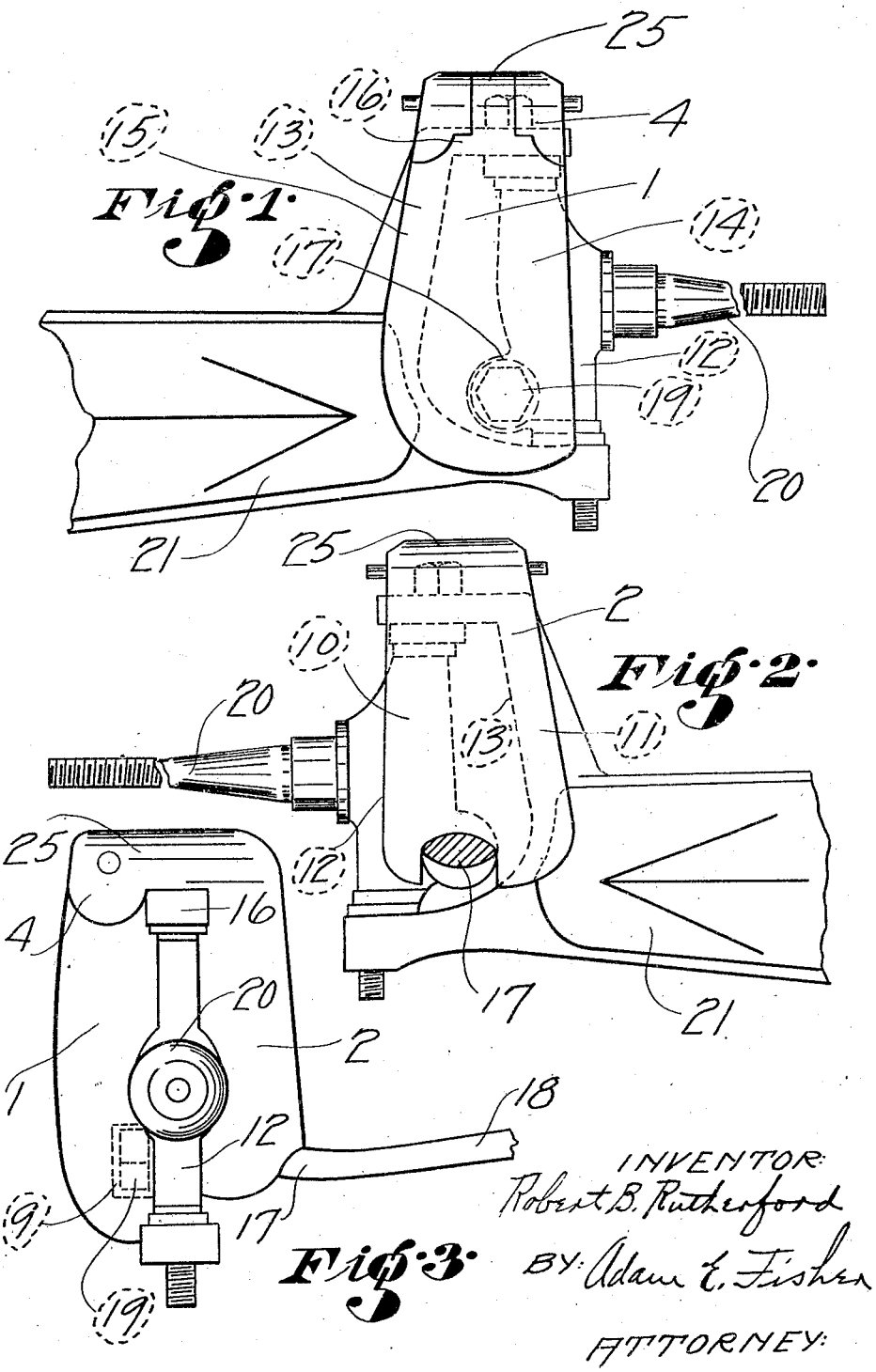

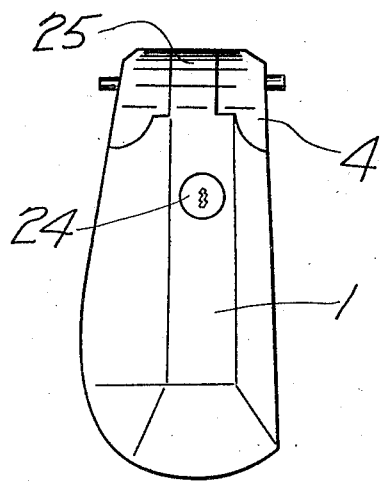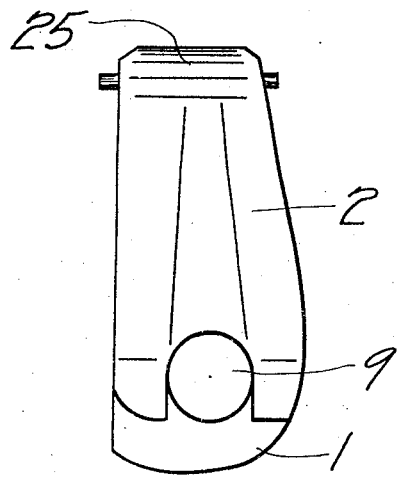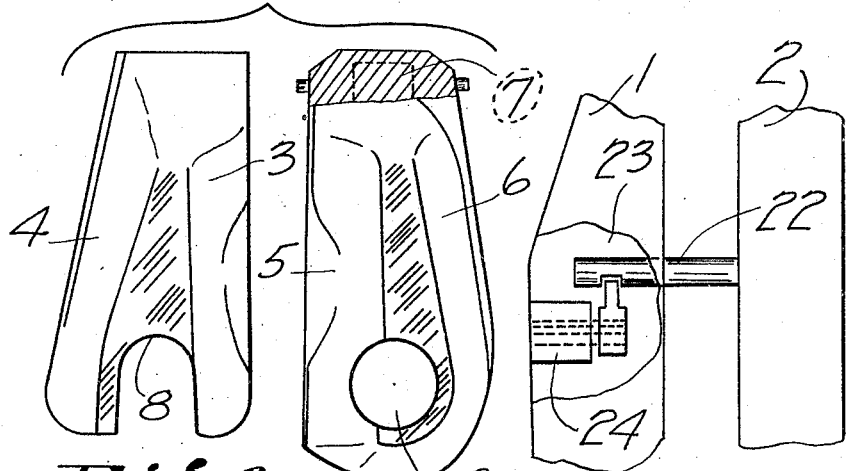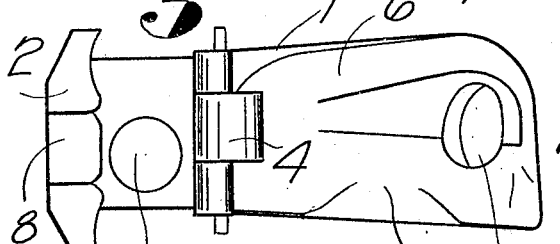

ROBERT B. RUTHERFORD, OF ST. LOUIS, MISSOURI.

AUTOMOBILE-LOCK.

1,395,146.  Specification of Letters Patent.  Patented Oct. 25, 1921.

Application filed April 28, 1921. Serial No. 465,193.

*To all whom it may concern:*

Be it known that I, ROBERT B. RUTHERFORD, a citizen of the United States, residing in the city of St. Louis and State of Missouri, have invented new and useful Improvements in Automobile-Locks, of which the following is a specification, reference being had to the accompanying drawings.

This invention is in the nature of an automobile lock; and the main object is to provide a simple and efficient lock which will hold the spindle of a front wheel of the automobile in rigid relation to the front axle, so as to make it impossible to steer the machine, and consequently will prevent the theft of the automobile.

In the drawings:

Figure 1 is a front view of a spindle and knuckle and axle, with the lock mounted over the knuckle.

Fig. 2 is a rear view of the same.

Fig. 3 is a side view.

Fig. 4 is a front view of the lock itself, detached from the machine.

Fig. 5 is a rear view of the detached lock.

Fig. 6 is an elevation showing the device cut in half.

Fig. 7 is a bottom plan view, the jaws being shown open.

Fig. 8 is a detail of a form of locking mechanism adapted to lock the jaws together.

In carrying out the invention as exemplified in the drawings, I provide a pair of lock jaws, 1 representing the frontal jaw and 2 the rear jaw. At the top of the rear jaw 2 is integrally formed or rigidly mounted a cap 25, projecting forwardly perpendicularly to said rear jaw, and to the forward side of this cap is hinged the frontal jaw 1 by means of a mortise hinge 4. The inner faces of the two jaws 1 and 2 and the cap 25 are nicely mortised out as shown in Figs. 3, 4, 5, 6, 7 and 8, to snugly engage the corresponding outstanding surfaces, to-wit: the rear faces 10 and 11 of the steering knuckle 12 and axle yoke 13; the frontal faces 14 and 15 of the same; the upper jaw 16 of the axle yoke 13; the shank 17 of the knuckle arm 18 and the nut 19 which secures the knuckle arm 18 to the knuckle 12, respectively. Of course, it is understood that the inner faces of the said jaws would be grooved, cut, mortised and formed somewhat differently for the various types of cars upon the market, to enable the jaws to close snugly upon the parts engaged, but the principle of the lock would remain constant in all cases, that is to say, the principle of setting the spindle 20 in rigid and fixed relation to the axle 21 by means of the said jaws 1 and 2 embracing the opposite sides of the knuckle 12, the axle yoke 13, the upper jaw of the axle yoke 13, the shank of the knuckle arm 18 and the nut 19 which secures the knuckle arm in place.

A lock bolt 22 projects from the inner face of the rear jaw 2 and is adapted to pass between the knuckle and yoke into the lock mortise 23 of the pin lock 24 when the jaws 1 and 2 are closed together over the parts described. Thus the spindle and axle may be readily locked in rigid relation, so as to render the successful steering of the car impossible. Any form of lock may be employed for locking the jaws together.

While I have herein described a certain specific method of constructing and assembling the elements of my invention, it is understood same may be varied in minor details, not departing from the spirit of my invention as defined in the appended claims.

I claim:

1. An automobile lock, comprising a pair of jaws hinged together at their top ends and adapted to fold down over the top and front and rear sides of one of the frontal steering knuckles and adjacent axle yoke; and means for locking the said jaws in said position.

2. An automobile lock, comprising a pair of jaws hinged together at their top ends, and chambered and mortised on their inner faces, and so adapted to fold down over the top and front and rear sides of one of the frontal steering knuckles and adjacent axle yoke so as to snugly engage the outstanding surfaces of said parts; and means for locking said jaws in said position.

3. An automobile lock, comprising a rear jaw mortised on its forward face to fit snugly over the rear surfaces of one of the frontal steering knuckles and adjacent axle yoke and down over the shank of the knuckle arm; a cap at the top of said rear jaw and extended forwardly, said cap being chambered out underneath to snugly engage the upper jaw of the axle yoke; a frontal jaw hinged to the forward side of said cap, same being chambered and mortised on its rear face to fit snugly over the frontal surfaces of said steering knuckle and axle yoke and over the connecting nut of the knuckle arm; and means for locking said jaws in said position.

4. An automobile lock, comprising a pair of jaws hinged together at their top ends and adapted to fold down over the upper jaw of the axle yoke of a frontal steering knuckle, and the front and rear sides of said knuckle and adjacent yoke, and the shank and connecting nut of the knuckle arm; a lock bolt extended forwardly from the frontal face of the rear jaw and adapted to pass between the said knuckle and axle yoke; a lock mortise cut in the forward jaw and adapted to receive the free end of said lock bolt; and means for locking said lock bolt into said lock mortise.

ROBERT B. RUTHERFORD.

Witnesses:
ADELE K. DOHLE,
M. L. GERAU.